United States Patent [19]

Chu

[11] Patent Number: 5,215,817

[45] Date of Patent: Jun. 1, 1993

[54] COMPUTER PRINTABLE COATED FILMS

[75] Inventor: Shaw-Chang Chu, Cranbury, N.J.

[73] Assignee: Mobil Oil Corporation, Fairfax, Va.

[21] Appl. No.: 793,878

[22] Filed: Nov. 18, 1991

[51] Int. Cl.$^5$ .............................................. B32B 5/16
[52] U.S. Cl. .................... 428/330; 428/516; 428/910
[58] Field of Search ............ 428/516, 330, 910

[56] References Cited

U.S. PATENT DOCUMENTS

| | | | |
|---|---|---|---|
| 4,420,580 | 12/1983 | Herman et al. | 524/424 |
| 4,663,216 | 5/1987 | Toyoda et al. | 428/212 |
| 4,981,758 | 1/1991 | Chu | 428/516 |

*Primary Examiner*—Edith L. Buffalow
*Attorney, Agent, or Firm*—Alexander J. McKillop; Malcolm D. Keen; Marina V. Schneller

[57] ABSTRACT

Monoaxially oriented polypropylene is coated with a pigmented polymer dispersion which imparts good print quality, ink adhesion, and smudge resistance to the ultimate biaxially oriented film.

18 Claims, No Drawings

COMPUTER PRINTABLE COATED FILMS

FIELD OF THE INVENTION

The present invention relates to a computer printable coating composition that can be applied on a film substrate during biaxially orientation of the film.

The invention relates to synthetically produced paper substitutes comprising biaxially oriented polypropylene film. In accordance with one embodiment of the invention, a monoaxially oriented polypropylene is coated with a pigmented polymer dispersion which imparts good print quality, ink adhesion, and smudge resistance to the ultimate biaxially oriented film.

BACKGROUND OF THE INVENTION

The present invention relates to a coated plastic film structure that is suitable for electronic data processing (EDP) printing applications, especially for dot matrix and laser printers.

Currently, address and mailing labels, bar code labels, and UPC labels are mostly made of paper substrates. Plastic substrates, as substitutes for paper substrates, are ideally suited for these applications. Compared to paper, plastic substrates in these end use applications provide the advantages of water resistance, durability, insensitivity to relative humidity, and compatibility to recyclable plastic objects which have the plastic label affixed thereto.

SUMMARY OF THE INVENTION

The present invention relates to computer printable coating composition that can be applied on a film substrate during the films orientation process. The film is preferably coated between the stages of the machine direction orientation and the transverse direction orientation. The coating is an aqueous, pigmented polymer dispersion comprising (I) a carboxylic acid or its alkali metal salt-functionalized olefinic copolymer such as ethylene-acrylic acid copolymer and (II) inorganic pigments such as titanium dioxide, aluminum silicates, calcium carbonate, etc. Uses for the coated film include computer printable labels and tapes.

DETAILED DESCRIPTION

The thermoplastic film of the invention comprises a base layer of a thermoplastic resin, which comprises polypropylene, upon which is disposed a coating layer of a carboxylic acid or its alkali metal salt-functionalized olefinic copolymer. The base layer, a relatively thick layer of the thermoplastic resin, is, as stated above, a resin which comprises polypropylene. Most preferably, the base thermoplastic film layer comprises a polypropylene homopolymer. However, the base layer may be a polypropylene homopolymer, a blend of a polypropylene homopolymer and another olefinic polymer, a multilayer co-extrusion of a polypropylene homopolymer and an olefinic polymer and the like. For example, the base thermoplastic film can comprise a polypropylene homopolymer or a co-extrusion of a polypropylene homopolymer and an olefinic polymer. The base thermoplastic film comprises a polypropylene homopolymer or a co-extrusion of a polypropylene homopolymer and an ethylene-propylene copolymer.

The above definition of thermoplastic resins within the contemplation of the polypropylene-containing thermoplastic film of this invention excludes thermoplastics other than olefinic polymers. Thus, commercially important film resins such as polyethylene terephthalate and polyvinyl chloride are not included in the scope of the present invention.

The ultimate thickness of the biaxially oriented film ranges from 10 to 100 microns.

The coating composition is an aqueous, pigmented polymer dispersion comprising (I) a carboxylic acid or its alkali metal salt-functionalized olefinic copolymer and (II) inorganic pigments. The carboxylic acid or its metal salt-functionalized olefinic copolymer can be present in the coating composition in an amount ranging from 90 to 50 wt %. The inorganic pigments can be present in the coating composition in an amount ranging from 90 to 50 wt %. The amount of coating applied to the thermoplastic substrate after the transverse direction orientation ranges from 1 to 10 microns.

The carboxylic acid or its metal salt-functionalized olefinic copolymer includes ethylene-acrylic acid copolymer, ethylene-methacrylic acid copolymer, and their alkali metal salts.

The inorganic pigments include titanium dioxide, aluminum silicates, calcium carbonate, diatomaceous earth, talc and silica. Preferably, the pigments are fine powders having particle sizes of less than 15 microns.

The pigmented coating may be further modified by additives and/or modifiers such as wax emulsions, colloidal silica dispersions, defoamers, and crosslinkers.

In another aspect of the present invention the coated film may be part of a composite film wherein the coated film is laminated onto or supported by another film ply which may be a plastic, paper or metal film.

The coated polypropylene-containing film is formed in a process wherein a polypropylene thermoplastic resin, which comprises the relatively thick polypropylene base layer, is melted and extruded through a slit die. The molten polypropylene-containing thermoplastic is cooled to form a solid sheet which is oriented in the longitudinal direction. The sheet is thereupon coated onto the surface of the longitudinally oriented film. The film is thereafter oriented in the transverse direction to form a biaxially oriented coated film.

In a preferred embodiment of this process the molten polypropylene-containing thermoplastic film is initially extruded through a slit die and cast onto a cooling drum wherein it is quenched to form a solid sheet. In a still more preferred embodiment, the quenching of the thermoplastic melt on the cooling drum is followed by reheating of the sheet prior to orienting in the longitudinal direction.

The step of orienting the thermoplastic sheet in the longitudinal direction is, in a preferred embodiment, provided by longitudinal direction stretching. Preferably, stretching in the longitudinal direction involves longitudinal stretching such that the film is increased from about 3 times to about 7 times its original length. More preferably, the film is increased from about 4 times to about 6 times its original length.

In accordance with the present invention the longitudinally stretched film, prior to the application of the coating layer, can be surface treated to improve surface wettability. This surface treatment is provided by corona treatment or flame treatment; the surface that is subsequently coated is corona treated.

After completion of the coating operation, the film is preferably subjected to heating to accelerate drying of the coating. Drying involves exposure of the film to elevated temperature. Depending upon the temperature employed in drying the coated monoaxially oriented film, the film may or may not be cooled or heated to obtain optimum temperature conditions during the next step, transverse orientation.

In the final essential step, the longitudinally oriented, coated film is oriented in the transverse direction. Preferably, orientation in the transverse direction is accomplished by transverse stretching. In the preferred embodiment wherein stretching is utilized to orient the film in the transverse direction, the film is stretched from about 5 to about 10 times its original width. More preferably, the longitudinally oriented film is stretched from about 6 to about 8 times its prestretched width.

The film is annealed following transverse direction orientation. Annealing of the biaxially oriented film involves exposure of the film to elevated temperature. As in all heating steps, preferred temperatures are a function of the identity and constituency of the polypropylene-containing thermoplastic resin constituting the film.

EXAMPLES

Example 1

An aqueous pigmented polymer dispersion of 40% solids was prepared by mixing 120 parts by weight of an ethylene-acrylic acid (EAA) copolymer dispersion (Michem Prime 4983 of 25% solids obtained from Michelman Corp.), 100 parts by weight of a titanium dioxide paste (Luconyl White 0022 of 70% solids obtained from BASF Corp.), and 30 parts by weight of de-ionized water. The ratio of pigment to binder is 70 to 30 by weight.

The coating was applied on a film substrate in the following manner: A piece of compression-molded polypropylene plaque (Exxon 4252 obtained from Exxon Corp.) of 20 mil-thick and 2.75"×2.75" in dimension was placed in a T. M. Long film stretcher. The plaque was heated at 320° F. for 90 seconds and then stretched 500% uniaxially. The coating was brush-coated "in-situ" on the stretched film strip. After being dried for 90 seconds at 320° F., the coated film was stretched 500% in a direction perpendicular to the initial direction.

The resulting film had a uniform white matte finish and showed good print quality, ink adhesion, and smudge resistance when subject to computer printing using a sheet-fed dot matrix printer (Epson 510).

Example 2

An aqueous pigmented dispersion of 40% solids was prepared by mixing 88.2 parts by weight of an EAA dispersion (Michem Prime 4990 of 34% solids obtained from Michelman Corp.), 100 parts by weight of a titanium dioxide paste (70% solids), and 61.8 parts by weight of de-ionized water.

In a manner similar to Example 1, the Example 2 coating was coated on polypropylene between the two stages of the film stretching process. This coated film also showed good print quality, ink adhesion, and smudge resistance when subject to the computer printing evaluation.

Example 3

An aqueous pigmented dispersion of 40% solids was prepared by mixing 120 parts by weight of an EAA dispersion (Michem Prime 4983 of 25% solids), 100 parts by weight of a titanium dioxide paste (70% solids), 22.5 parts by weight of de-ionized water, and 20 parts by weight of a carnauba wax emulsion (Michem Lube 193 obtained from Michelman Corp.).

The Example 3 coating was coated on polypropylene in a manner similar to that for Example 1. This coated film gave good print quality with improved smudge resistance.

Comparative Example A

A control film sample was prepared in a manner similar to Example 1 except that the aqueous pigmented coating was omitted. This uncoated film, after being treated with corona discharge, gave poor print quality and low smudge resistance.

Thus it is apparent that there has been provided, in accordance with the invention, a synthetically produced paper substitute, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A printable coated biaxially oriented film consisting essentially of
    a supported coating and a support
        wherein the supported coating consists essentially of a olefinic copolymer containing carboxylic acid groups or its metal salt-functionalized olefinic copolymer which comprised 10 to 50 weight percent of the coating and an inorganic pigment which comprised 90 to 50 weight percent of the coating; and
        wherein the support is a thermoplastic film comprising polypropylene.

2. A film in accordance with claim 1, wherein said thermoplastic is selected from the group consisting of a polypropylene homopolymer, a blend of a polypropylene homopolymer and ethylene-propylene copolymer, a co-extrusion of a polypropylene homopolymer and ethylene-propylene copolymer.

3. A film in accordance with claim 1, wherein said thermoplastic resin is selected from the group consisting of a polypropylene homopolymer and a co-extrusion of a polypropylene homopolymer and ethylene-propylene copolymer.

4. A film in accordance with claim 1, wherein said thermoplastic resin is a polypropylene homopolymer.

5. A film in accordance with claim 4, wherein said coating layer comprises a copolymer of ethylene and acrylic acid.

6. A film in accordance with claim 5, wherein the inorganic pigment is at least one selected from the group consisting of titanium dioxide, aluminum silicate, calcium carbonate, diatomaceous earth, talc and silica.

7. A film in accordance with claim 6, wherein the inorganic pigment has a particle size of less than 15 microns.

8. A film in accordance with claim 7, wherein the inorganic pigment is titanium dioxide.

9. A film in accordance with claim 1, wherein the transverse orientation comprises a film stretched from about 5 times to about 10 times its original length.

10. A printable coated biaxially oriented film, having a white matte finish, consisting essentially of the product produced by transverse orientation of a supported coating and a support film for said coating, which support film is a longitudinally oriented film and which is a thermoplastic wherein the supported coating consists essentially of a carboxylic acid or its meal salt-functionalized olefinic copolymer which comprises 10 to 50 weight percent of the coating and an inorganic pigment which comprises 90 to 50 weight percent of the coating; and wherein the support is a thermoplastic film comprising polypropylene.

11. A film in accordance with claim 10, wherein said thermoplastic is selected from the group consisting of a polypropylene homopolymer, a blend of a polypropylene homopolymer and ethylene-propylene copolymer, and a co-extrusion of a polypropylene homopolymer and ethylene-propylene copolymer.

12. A film in accordance with claim 11, wherein said thermoplastic resin is selected from the group consisting of a polypropylene homopolymer and a co-extrusion of a polypropylene homopolymer and ethylene-propylene copolymer.

13. A film in accordance with claim 12, wherein said thermoplastic resin is a polypropylene homopolymer.

14. A film in accordance with claim 11, wherein said coating layer comprises a copolymer of ethylene and acrylic acid.

15. A film in accordance with claim 14, wherein the inorganic pigment is at least one selected from the group consisting of titanium dioxide, aluminum silicate, calcium carbonate, diatomaceous earth, talc and silica.

16. A film in accordance with claim 15, wherein the inorganic pigment has a particle size of less than 15 microns.

17. A film in accordance with claim 16, wherein the inorganic pigment is titanium dioxide.

18. A film in accordance with claim 11, wherein the transverse orientation comprises a film stretched from about 5 times to about 10 times its original length.

* * * * *